Oct. 31, 1961

C W. MUSSER 3,006,215

TORQUE EQUALIZER

Filed Oct. 11, 1960

Inventor
C Walton Musser
By his Attorneys

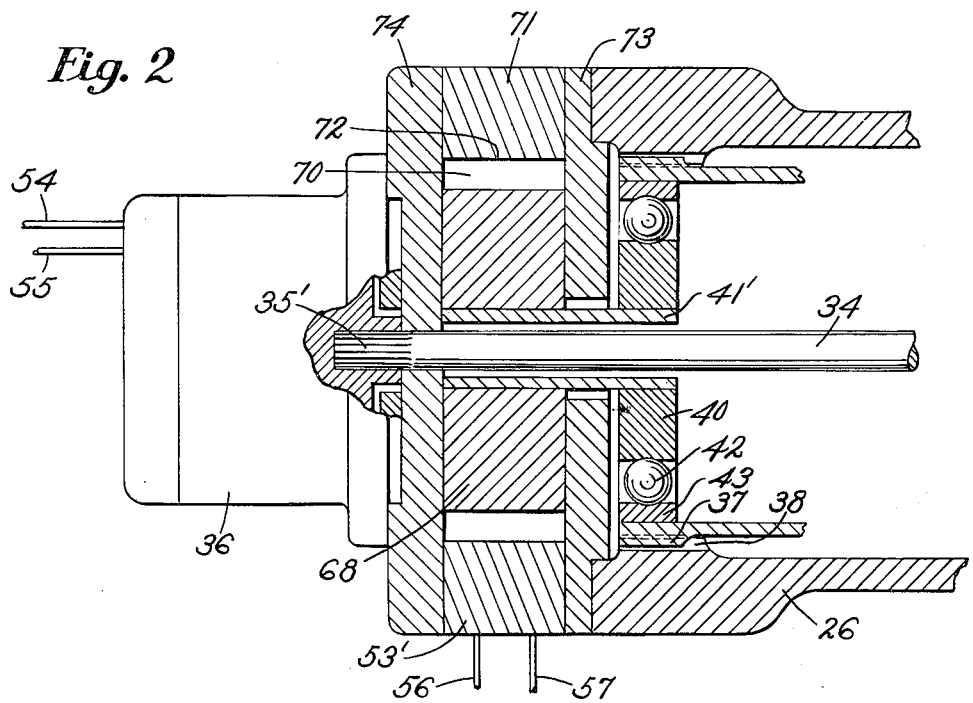
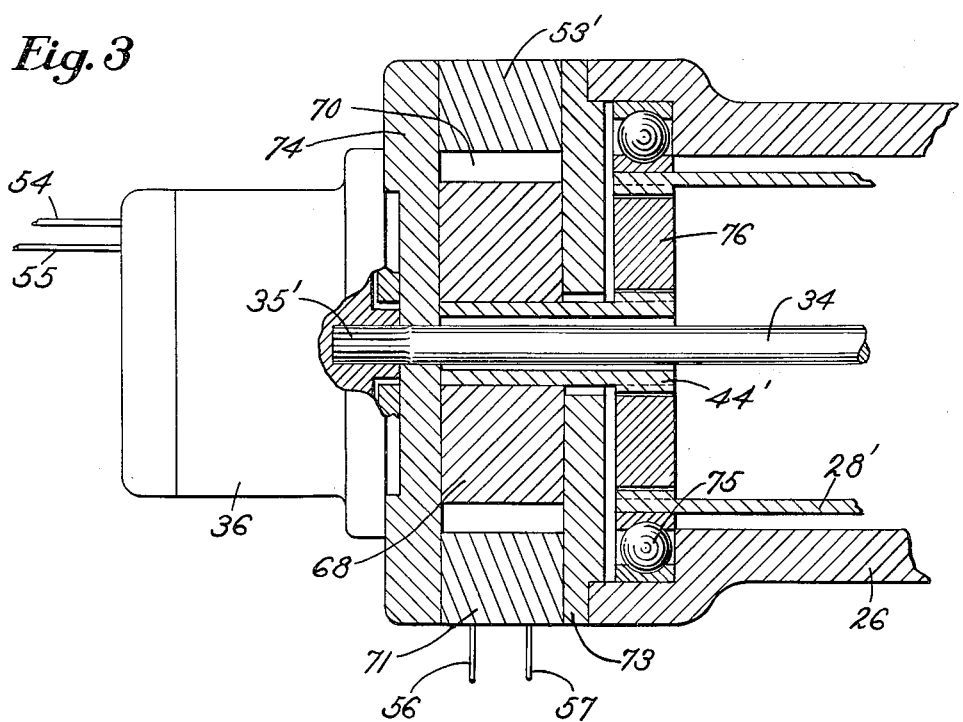

Oct. 31, 1961     C W. MUSSER     3,006,215
TORQUE EQUALIZER

Filed Oct. 11, 1960     4 Sheets-Sheet 3

United States Patent Office 3,006,215
Patented Oct. 31, 1961

3,006,215
TORQUE EQUALIZER
C Walton Musser, Beverly, Mass., assignor to United Shoe Machinery Corporation, Flemington, N.J., a corporation of New Jersey
Filed Oct. 11, 1960, Ser. No. 61,964
17 Claims. (Cl. 74—665)

The present invention relates to torque equalizing devices of the character which are useful for multiple drives where a plurality of driving units must apply torque to a common output such as a gear, a shaft or the like.

A purpose of the invention is to equalize the torque of each of a number of driving shafts regardless of the velocity, phase or direction of rotation of the input.

A further purpose is to provide an adjustable torque limiter safety device.

A further purpose is to provide means for obtaining any rotational velocity which may be desired from zero to a maximum in either direction from multiple drives.

A further purpose is to eliminate drive motor "sticktion" (that is, breakaway friction) by permitting fluid motors and gear reductions to remain in motion at zero velocity as well as at all other velocities of drive.

A further purpose is to obtain a considerably wider range of speeds without resorting to multiple gear ratios, and thus eliminate the need for clutches.

A further purpose is to provide means of automatically introducing blacklash control which can be made effective at any desired torque level and adjusted so as not to detract from the power output at high torque levels.

A further purpose is to directly indicated output torque at all torque levels.

A further purpose is to permit continued operation in the event that one of the driving units becomes ineffective.

A further purpose is to greatly increase and preferably double the speed of slewing of a rotating member such as a bull gear or turret.

Further purposes appear in the specification and in the claims.

In the drawings I have chosen to illustrate a few only of the numerous embodiments in which the invention may appear, selecting the forms shown from the standpoints of convenience in illustration, satisfactory operation and clear demonstration of the principles involved.

FIGURE 2 is a fragmentary view similar to FIGURE 1 showing a variation.

FIGURE 3 is a fragmentary view similar to FIGURE 1 showing a further variation.

Figure 1:
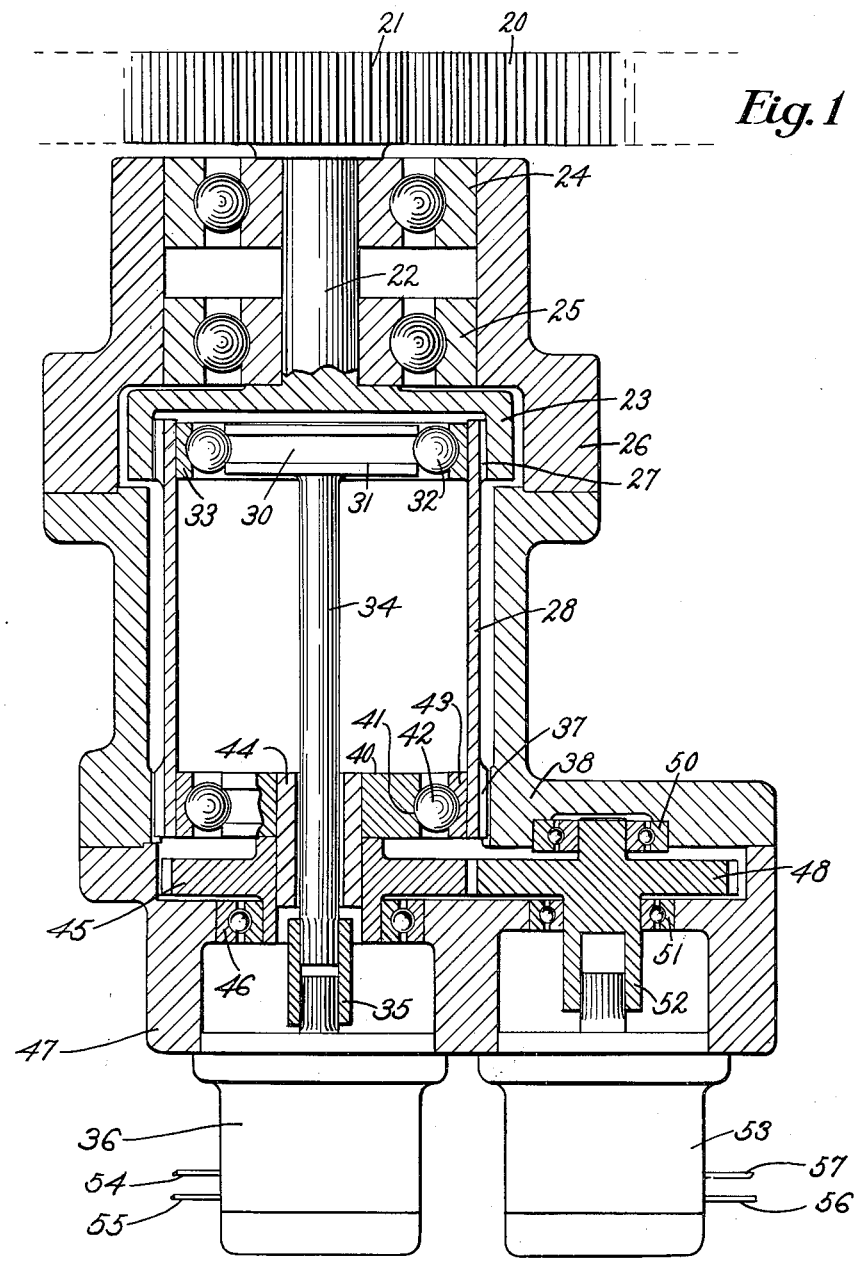
FIGURE 1 is a diagrammatic axial section of a preferred embodiment of the invention.

Describing in illustration but not in limitation and referring to the drawings:

There are many commercial installations where it is desirable to use multiple fluid driving motors which are driving a common output, which may be a bull gear or other huge gear, a turret, a turntable, or the like.

There are many reasons why it is desired to drive a single output such as a bull gear from more than one drive shaft, usually through several different pinions. Among these reasons may be noted the following:

a. This divides the power transmission among several different pinions and permits smaller tooth surface width on the bull gear and the pinions.

b. by providing more than one circumferentially spaced driving pinion, a couple is obtained which causes considerably lower friction loss and less deflection in the center bearing of the bull gear on the bull gear shaft.

c. Since the speed reduction units are smaller, they are considerably easier to handle and the mass of the drive can be better distributed instead of being located in one place.

d. Smaller fluid motors can be used as prime movers. This generally provides lower input inertia with a considerably faster response time. The controls, which are usually electronic amplifiers, are easier to produce with a desired power level. Also clutches, valves and other equipment are more readily available in medium and small sizes.

e. Backlash of the bull gear is more easily controlled.

f. Generally there is an increase in the reflected rigidity, since the bull gear is restrained at a number of points instead of only one point.

g. The convenience of installation and maintenance is increased.

h. The device can function even though a breakdown occurs on one drive.

There are very serious difficulties, however, which are encountered in a device of this kind. Some of these difficulties are:

a. In order that there be a smooth output or a fairly good efficiency, it is necessary that all of the driving motors operate strictly in synchronism. In the prior art drives, however, this is completely impossible.

b. Even if the driving motors were running in strict synchronism, there may be sizable variations in the output torque of one pinion with respect to another, due to inequalities in the dimensions of the teeth of the bull gear, or due to eccentricity in the bull gear or in the pinions.

c. If there is a lack of uniformity in the torque between the different driving units, there is usually a large loss in power.

d. One way of overcoming the lack of synchronous operation is by installing torque-limiting clutches between the driving motor and the output pinion. In this type of installation, when the motors do not operate in synchronism, these clutches will slip to prevent damage to the equipment. When operating under a variable load, however, such as a wind applied to a rotating radar antenna or applied to an astronomical telescope dome, this will create an erratic output.

e. Under the conditions where torque limiter clutches are used and a variable load is applied, all of the driving units are operating at maximum torque output at all times, but one or more of these units is fighting the other units, and this represents a great waste of power.

Especially at the null point, the action is very erratic.

Where several different hydraulic motors are driving a common output, the starting friction of the motors is frequently considerably higher than the running friction. As a consequence, an attempt to start two hydraulic motors when they are connected in parallel usually results in one motor starting and running while the other motor never gets started. For example, if the starting friction of one hydraulic motor requires 200 pounds per square inch to break it loose, while another hydraulic motor connected in parallel only requires 150 pounds per square inch to break it loose, the motor which breaks loose at 150 pounds will start and run while the other motor will never break loose or start. It is not uncommon in the case of a hydraulic motor to require 200 pounds per square inch to cause it to start, when the same motor once started will operate at 25 pounds per square inch.

If these two hydraulic motors under discussion were connected to the input of a gear reduction unit having a ratio of say 40,000:1 with the output connected to a common gear or shaft, the one unit would start and run and build up a tremendously high torque, while the other motors will never start. Many attempts have been made to obtain synchronous operation between a group of hydraulic motors, but all such prior art devices have left something to be desired. The problem is further complicated by the fact that there are slight differences in individual hydraulic motors, since each motor will have a slightly different cubic capacity and a slightly different slip than other motors of the same lot. Even very elaborate electronic control systems have not been capable of producing and maintaining synchronous operation. In the case of electronic controls, there is the problem of difference in control valves of each unit and drift of the electronic amplifiers which are used to control the valves.

In accordance with the present invention the output torque between units is equalized. The device of the invention will cause the output torque of one hydraulic drive unit to be the same as the output torque of any other hydraulic drive unit regardless of the number of units which are employed. It is therefore possible according to the invention to connect to an output device such as a bull gear, turret, turntable, shaft or the like, four or more hydraulic drive units, and all of these units will tend to drive the output device by applying the same amount of torque. This is true regardless of the direction or velocity of rotation of the individual driving hydraulic motors. The output torque of the bull gear or other output device will be that produced by the sum of the equalized hydraulic drives. The velocity of the bull gear or other output device will be the algebraic sum of the input.

For example, if all of the inputs are rotating clockwise 400 r.p.m. for 40,000:1 overall reduction ratio, the output device will be turning at 1/100 of a revolution per minute. However, if two of the four hydraulic driving motors were running 400 r.p.m. and the other two hydraulic driving motors were not rotating at all, as would be possible in the prior art, the output velocity would be 1/200 of a revolution per minute. And in the event that two out of four of the hydraulic driving motors were turning 400 r.p.m. clockwise and the other two hydraulic motors were turning 400 r.p.m. counterclockwise, as would be possible in the prior art, there would be no motion on the output device.

The device of the invention offers a number of distinct advantages. No matter how many hydraulic drives are connected to the common output device, equal torque is delivered by each hydraulic drive, regardless of the velocity, phase or direction of rotation of the input.

The device of the invention also makes it possible to obtain an accurately adjustable torque limiter safety.

Any rotational velocity can be obtained from zero to a maximum in either direction.

Problems of "sticktion" of the hydraulic drive motors can be eliminated by permitting the hydraulic drive motors and their gear reductions to remain in motion at zero velocity as well as at all other velocities.

The invention makes it possible to obtain a wide variety of different speeds of the output without requiring multiple gear ratios, so that clutches can often be eliminated.

The invention also makes it possible to effectively control backlash at any desired torque level and this can be adjusted so as not to detract from the power output at high torque levels.

The device also lends itself to directly indicating output torque at all torque levels.

In case one of the hydraulic drive motors becomes inoperative, the device can nevertheless continue to function.

As long as adequate hydraulic capacity is available, the speed of slewing of a turret or radar antenna or similar device can be greatly increased, for example duplicated.

In all of the drawings the illustrations are diagrammatic and features of common engineering practice such as devices for aligning bearings and providing seals of bearings have been eliminated for convenience in illustration. Also bolts and other common fastening means have been eliminated.

Considering first the form of FIGURE 1, I there illustrate an output device, suitably a bull gear 20, which has intermeshing therewith at a plurality of circumferential positions (only one of which is shown) a driving pinion 21 which is suitably integral with a driving shaft 22 which is connected with and suitably integral with an output circular spline or rigid internal gear 23. The gear 23 is circular and has internal teeth. Shaft 22 is journalled on suitably anti-friction bearings 24 and 25 which are held within a housing 26.

Splined on the circular spline 23 at the major axis of an elliptoid are external gear teeth 27 of a flexible spline 28, which functions as an equalizer shaft. The interior teeth on the circular spline 23 and the exterior teeth 27 are compatible so that they fit together at the points of contact. The flexible spline teeth are in contact with the teeth of the circular spline 23 at a plurality of spaced points, suitably two (or three), with intermediate points at which the teeth are out of mesh and out of contact, and the construction conforms to the construction of a harmonic drive or of strain wave gearing as referred to in my U.S. Patent No. 2,906,143, granted September 29, 1959, for Strain Wave Gearing, and the divisions thereof.

The elliptoidal shape of the gear teeth 27 at the end of the flexible spline 28 is maintained by wave generator 30 which consists of an inner preferably elliptoidal race 31, bearing elements 32, here shown as bearing balls, and an outer suitably elliptoidal race 33 which conforms to the inside of the flexible spline 28. The wave generator 30 is rigidly fastened on and driven by a through shaft 34 which is coupled by coupling 35 to fluid (suitably hydraulic) control motor 36 mounted on the housing 26. The coupling 35 is suitably splined to the shaft 34 and to the hydraulic motor shaft, as known in the art.

The flexible spline 28 at the end opposite from the gear teeth 27 has external gear teeth 37 distributed around its outside which are in engagement at a plurality of circumferentially spaced points, suitably two or three, with intermediate points of non-engagement, with teeth of an internal ring gear 38 on the inside of the housing 26. The interior or teeth of ring gear 38 and the exterior teeth 37 are compatible so that they fit together where they are in contact. The teeth 37 on the flexible spline are held in deflected form, suitably elliptoidal, by elliptoidal wave generator 40, which is composed of an inner suitably elliptoidal race 41, bearing elements (suitably bearing balls) 42, and an outer suitably elliptoidal race 43 which engages the interior of the flexible spline 28. This construction constitutes a harmonic drive or strain wave gearing according to my patent above refererd to.

The wave generator 40 is coupled by being keyed to a sleeve 44 (surrounding the shaft 34) which in turn is keyed to a spur gear 45 journalled on anti-friction bearing 46 which is mounted on housing extension 47. A spur gear 48 journalled on anti-friction bearings 50 and 51 in the housing, meshes with spur gear 45. Spur gear 48 is coupled at 52 with the rotor of fluid torque equalizing motor-pump 53, which in turn is mounted on the housing.

Fluid control or drive motor 36 has two control lines 54 and 55 and fluid torque equalizing motor-pump 53 has two fluid control lines 56 and 57. Both motors are preferably hydraulic motors.

In order to explain the operation more specifically, let it be assumed that the output ring spline 23 and the internal ring gear 38 on the housing, which are suitably both of the same diameter, each have 402 teeth. Let it further be assumed that the flexible spline 28 has 400 teeth at each end, the teeth being of a tooth size and form which will engage with the internal teeth on the ring spline 22 and on the internal ring gear 38. Under these conditions, with two lobes on the wave generator, and the wave generator 40 stationary, the teeth 37 on the flexible spline are in mesh and splined to the teeth on the internal ring gear 38, so that flexible spline 28 does not turn. If now the driving or control motor 36 turns, the shaft 34 turns and the wave generator 30 turns, the teeth 27 on the flexible spline 28 will cause the spline teeth on the output ring spline 23 to rotate, as will be evident from the description in my patent above referred to. Since ring spline 23 is the output and it has 402 teeth, the gear ratio between the flexible spline 28 and the output ring spline 23 will be 201:1. Thus it will take 201 revolutions of the control motor 36 to cause one revolution of the output by pinion 21 when the wave generator 40 is stationary. However, since the harmonic drive operates as a speed increaser as well as a speed reducer, the torque that is applied to the output pinion 21 is transmitted back from the output by shaft 22, ring spline 23, through the teeth 27 of flexible spline 28, back to the teeth 37 of the flexible spline 28. This then exerts a tendency to make wave generator 40 rotate, producing a torque in spur gear 45, spur gear 48 and the rotor of fluid torque equalizing motor-pump 53. This reaction torque, as it may be called, builds up a differential in pressure between fluid lines 56 and 57 which is directly indicative of the amount of torque at the output pinion 21.

Figure 5:
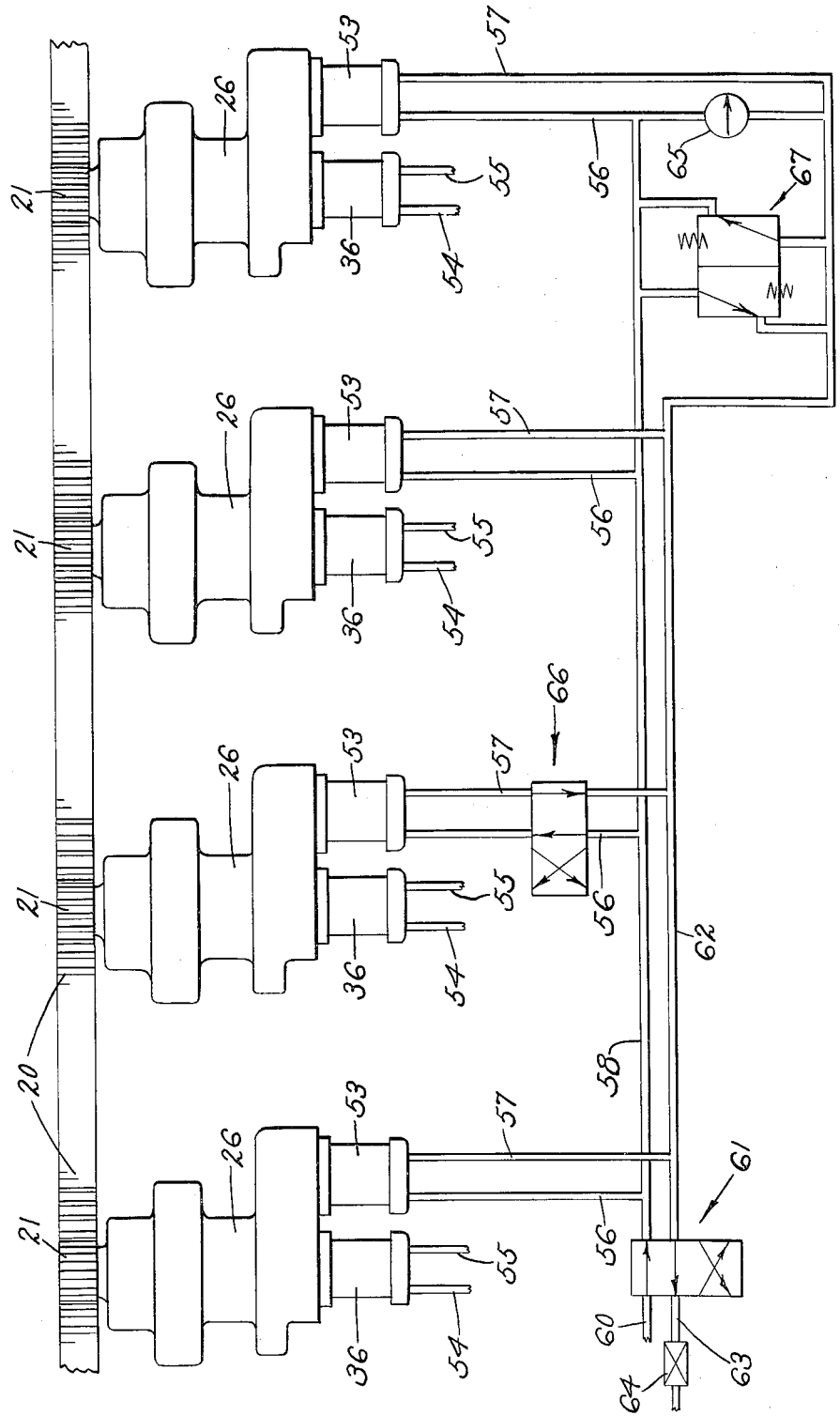
FIGURE 5 is a diagram of a suitable set of fluid connections for the equalizer fluid motors of the device of the invention.

Considering now FIGURE 5, if there are four units as illustrated in FIGURE 1 distributed with the drive pinions 21 all driving the same bull gear 20, it will be noted that the control piping 54 and 55 to the four fluid (hydraulic) motors 36 are disconnected and they are shown this way to indicate that they are separate control valves and separate control mechanism for the high pressure and low pressure piping to each of the control or drive motors 36. By showing these pipes disconnected, however, it is not intended to indicate that they may not be connected in parallel with a common high pressure line and a common low pressure line if desired. This is usually not done, however, because the response time of a large fluid valve is too long to be acceptable in most installations.

All of the connections 56 from the fluid torque equalizing motor-pumps 53 are connected to a common fluid line 58 which is normally connected at all times to high pressure line 60 through four-way valve 61 so as to keep the torque equalizer lines fully filled. Also all of the fluid connections 57 from the opposite sides of the fluid torque equalizing motor-pumps are connected to common fluid line 62 which has a connection through a separate port of four-way valve 61 to return line 63, but is normally not connected to the return line because return valve 63 is normally closed, but can be opened for fast slewing.

An output torque indicating gage between lines 58 and 62 is provided at 65. A two-way torque limiting pressure release valve 66 is connected between lines 58 and 62.

Normally the only flow in the torque equalizing lines 58 and 62 is between one motor-pump 53 and another motor-pump 53 to provide torque equalization. Thus, if one control motor 36 is producing more than its share of torque, the reaction torque which it produces on its corresponding torque equalizing motor-pump will be great enough to cause its torque equalizing motor-pump to act as a pump and provide fluid through line 58 to drive other torque equalizing motor-pumps which are associated with control motors which are producing less torque, and increase the torque output by such other driving units until all are equal in output torque.

If the return line valves 61 and 64 are open, then the torque equalizing motor-pumps can be operated for as long as desired as extra motors to add to or substract from the output velocity generated by the control motors, depending upon the direction of operation. The four-way valve 61 permits operation in either direction so that the high pressure could be provided either at line 58 or line 62.

It is frequently desirable in a gun-aiming system, a radar antenna, a radio telescope or any other accurately aimed device, to rapidly slew to another position. By providing the capability of using the torque equalizing motor-pumps to aid the control motors in rapid slewing, the speed of the slewing action is greatly increased.

The output torque indication is obtained by the pressure gage 65 connected between the torque equalization lines. This will provide an indication of the amount and the direction of the torque, if it is capable of indicating pressure in either direction.

The two-way release valve 66 connected between the torque equalization lines provides an effective torque limiting device.

A four-way valve 67 is shown in the lines 56 and 57 from one of the fluid torque equalizer motor-pumps 53. This valve can be shifted to reverse the lines as a means of automatically controlling the backlash at low torque level. If it is assumed, for example, that each of the drive units is designed to deliver an output torque of 50,000 pound inches, there will of course be a relatively high pressure differential in the torque equalizing lines 58 and 62. The four-way valve 67 will conveniently be of the pressure responsive type which will reverse automatically when the pressure between the lines 58 and 62 drops to a predetermined low level, for example below 10,000 pound-inches of torque. Then whenever the torque drops below 10,000 pound-inches, the one equalizing unit will reverse due to reversal of the valve 67 and this reversal of the direction of the torque will tend to keep any play or backlash from entering the system.

FIGURE 2 illustrates a modification of the device of FIGURE 1 wherein the spur gears 44 and 48 have been eliminated by using an equalizing motor-pump 53' which is of the well-known balanced vane type. In this case the bushing 44' from the wave generator 40 extends to the vane rotor 68 which is keyed thereon. As well known in the art the vane rotor contains generally radial vanes 70 which move radially in and out of the rotor as the rotor 68 rotates in the housing 71 which has an elliptical, elliptoidal or other non-circular interior contour 72 as well known. The vanes are suitably spring urged outwardly. The vane rotor 68 is provided with housing covers 73 and 74 at the opposite ends, and the housing covers have suitable central opening. The torque equalization lines 56 and 57 connect on inlet and outlet sides of the motor-pump 53' and are connected in the same way as previously described (FIGURE 5). Here the shaft 34 is splined directly to the rotor of control motor 36 at 35'.

The device of FIGURE 3 is a variation in the device of FIGURE 2 in that the flexible spline 28' has direct interconnection with the rotor 68 of the fluid equalizer motor-pump 53'. The flexible spline 28' is circular at its lower end and journalled on an exterior circular anti-friction (ball) bearing 75 which also forms the rotor bearing. Interconnection to sleeve 44' is made by circular disc 76 keyed to the sleeve 44′ and keyed to the flexible spline 28′.

Figure 4:
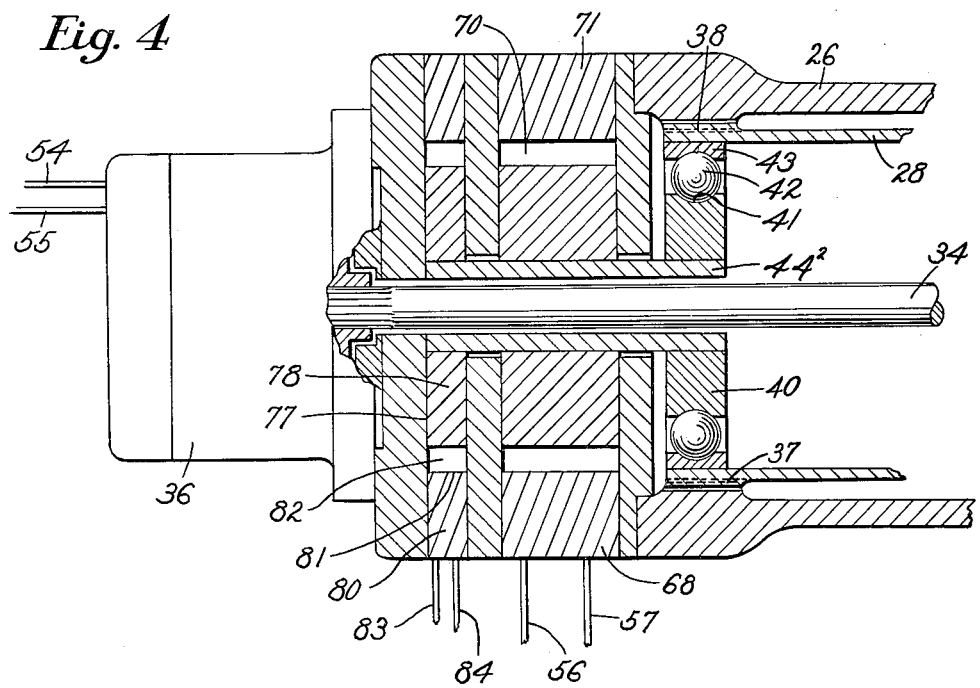
FIGURE 4 is a fragmentary half section similar to FIGURE 1 showing a still further variation.

FIGURE 4 shows an alternate means of obtaining backlash control. In this form the bushing 44² has been further extended so as to include and be keyed to an additional vane motor-pump 77 having a vane rotor 78, the vane rotor having a housing 80 with an interior non-circular contour 81 as already described, acting on vanes 82 which rotate and slide radially inwardly and outwardly in the rotor 78 as well known, suitably being spring urged outwardly. The two fluid lines 83 and 84 on the input and output sides are connected to a source of fluid (hydraulic) pressure and to a return line to provide the desired pressure differential.

When a pressure differential is supplied to the lines 83 and 84 to overcome backlash, it biases the amount of the output torque. As a consequence, by providing the proper pressure differential to each of the four units, one drive unit will for example be made to have a negative output torque of 5,000 pound-inches, another drive unit will for example have a negative toruqe of 1333 pound-inches, another drive unit will for example have a positive torque of 1333 pound-inches and the last drive unit will be made to have a positive output torque of 5,000 pound-inches. These values are the torque bias values which would be added to any torque introduced by the control motors 36 in the operation of the system. For example, if a nominal torque of 50,000 pound-inches were being supplied, the torque levels of the four drive units would be 45,000 pound-inches, 48,666 pound-inches, 51,333 pound-inches and 55,000 pound-inches respectively in the example given. By biasing the torques in these units in this manner, the normal backlash that occurs in one place in the operation would no longer be there. Instead the backlash would be split up over a 10,000 pound-inches torque range, which would mean that the actual backlash between the bull gear 20 and the pinion 21 and the windup in each unit would occur at a different torque value.

Thus, it will be seen that the different units may be provided with negative torques and positive torques at respectively different values (below the operating output torque) to overcome and distribute the effective backlash.

Since each of these units can be operated independently of the other units and still cause the same amount of torque to be applied to the output of all pinions, it becomes obvious that the units can be run so as to add or subtract to the output velocity. If two drive units were to be operated at 200 r.p.m. in a clockwise direction and the other two drive units were to be operated at 200 r.p.m. in a counterclockwise direction, all control motors and all equalizer motor-pumps will be running and there will be no "sticktion" problem of any kind. Using this system, the speeds of these motors and motor-pumps can be varied so that the alegbraic sum becomes a positive or a negative figure and the rotation of the bull gear will occur in either direction as desired.

In view of my invention and disclosure, variations and modifications to meet individual whim or particular need will doubtless become evident to others skilled in the art, to obtain all or part of the benefits of my invention without copying the structure shown, and I, therefore, claim all such insofar as they fall within the reasonable spirit and scope of my claims.

Having thus described my invention what I claim as new and desire to secure by Letters Patent is:

1. In a torque equalizer, an output device, a plurality of driving shafts each operatively connected to the output device, bearings journalling the driving shafts, an equalizer shaft for each driving shaft bearings journalling the equalizer shafts, gearing interconnecting each equalizer shaft to a corresponding driving shaft, said gearing including input means for relatively moving said driving shaft with respect to said equalizer shaft while said equalizer shaft is rotationally stationary, a control motor operatively interconnected to each input means driving said input means and through the gearing driving the driving shaft, an equalizing fluid motor-pump for each equalizer shaft operatively interconnected thereto to selectively drive said equalizer shaft in either direction or hold said equalizer shaft stationary in respect to rotation, each equalizing fluid motor-pump having a fluid connection at each side thereof, fluid means for connecting the fluid connections of a plurality of the equalizing motor-pumps on one side together, and fluid means for connecting the fluid connections of said plurality of equalizing motor-pumps on the other side together.

2. A device of claim 1, in which the gearing between the equalizer shaft and the driving shaft comprises a harmonic drive including relatively external and internal sets of teeth, one of which sets is in contact with the other at a plurality of spaced points with intermediate points at which the teeth are out of mesh and contact, and a wave generator acting on one of said sets of teeth which moves the points of contact around the gearing as the wave generator turns.

3. A device of claim 1, in which the input means to said gearing is through a wave generator, said wave generator being interconnected with said control motor.

4. A device of claim 1, in which each said equalizer shaft is directly connected to each said equalizing fluid motor-pump.

5. A device of claim 1, in which each said equalizer shaft is interconnected with the corresponding equalizing motor-pump through a second set of gearing.

6. A device of claim 1, in which each said equalizer shaft is connected with the corresponding equalizing motor-pump through a second set of gearing which includes relatively internal and external sets of teeth, one of said sets of teeth being in contact at a plurality of spaced points with intermediate points at which the teeth are out of mesh and contact and a wave generator deflecting one set of teeth to move the points of tooth contact around the circumference.

7. A device of claim 6, in which the wave generator of the second set of gearing is interconnected with the equalizing fluid motor-pump.

8. A device of claim 6, in which the wave generator of the second set of gearing is interconnected directly with the rotor of the equalizing fluid motor-pump.

9. A device of claim 1, in combination with means for cancelling backlash of each driving shaft.

10. A device of claim 1, in combination with means for reversing the fluid connections between at least one of the equalizer motor-pumps and the others.

11. A device of claim 1, in combination with further fluid pressure motor means applied to the equalizer shaft in opposition to the direction of the main torque, and means for applying fluid pressure thereto.

12. A device of claim 1, in combination with means for applying a counter torque on at least one of the equalizer shafts at a level below the level of the main torque.

13. A device of claim 1, in combination with an auxiliary motor connected to each equalizer shaft in addition to said equalizer motor-pump, and means for applying torque by at least one auxiliary motor in opposition to the torque applied by at least one other auxiliary motor.

14. A device of claim 1, in combination with means for applying torque at a low level compared to the level of the output torque to certain equalizer shafts in one direction and to certain other equalizer shafts in the opposite direction.

15. A device of claim 1, in combination with means for applying torque to different equalizer shafts at different levels in one direction and for applying torque to other equalizer shafts at different levels in the opposite direction, said torque being all at a level below the level of the main torque output.

16. A device of claim 1, in combination with a torque limiting pressure relief valve connected between the equalizer fluid connections.

17. A device of claim 1, in combination with means for connecting one side of the equalizing motor-pumps to high pressure fluid and for connecting the other side of the equalizing motor-pumps to return for fast slewing.

References Cited in the file of this patent

UNITED STATES PATENTS

| | | |
|---|---|---|
| 2,607,166 | Youkers | Aug. 19, 1952 |
| 2,906,143 | Musser | Sept. 29, 1959 |
| 2,959,975 | Lingel | Nov. 15, 1960 |

FOREIGN PATENTS

| | | |
|---|---|---|
| 896,773 | France | Mar. 2, 1945 |